Oct. 6, 1936.  R. S. TROTT  2,056,873
ENGINE MOUNTING
Filed July 13, 1932  2 Sheets-Sheet 1
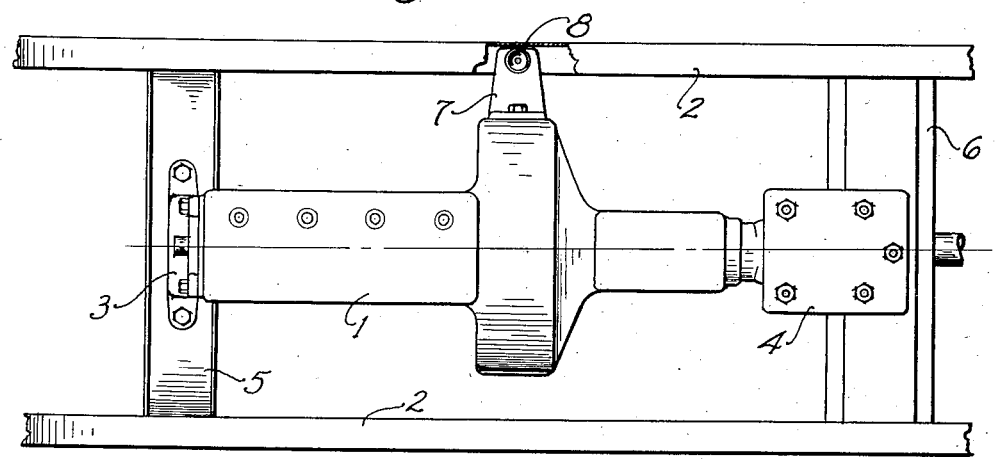
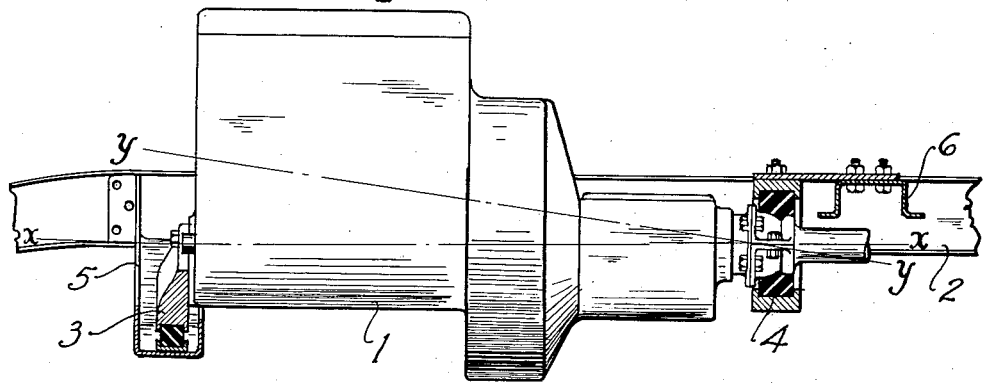

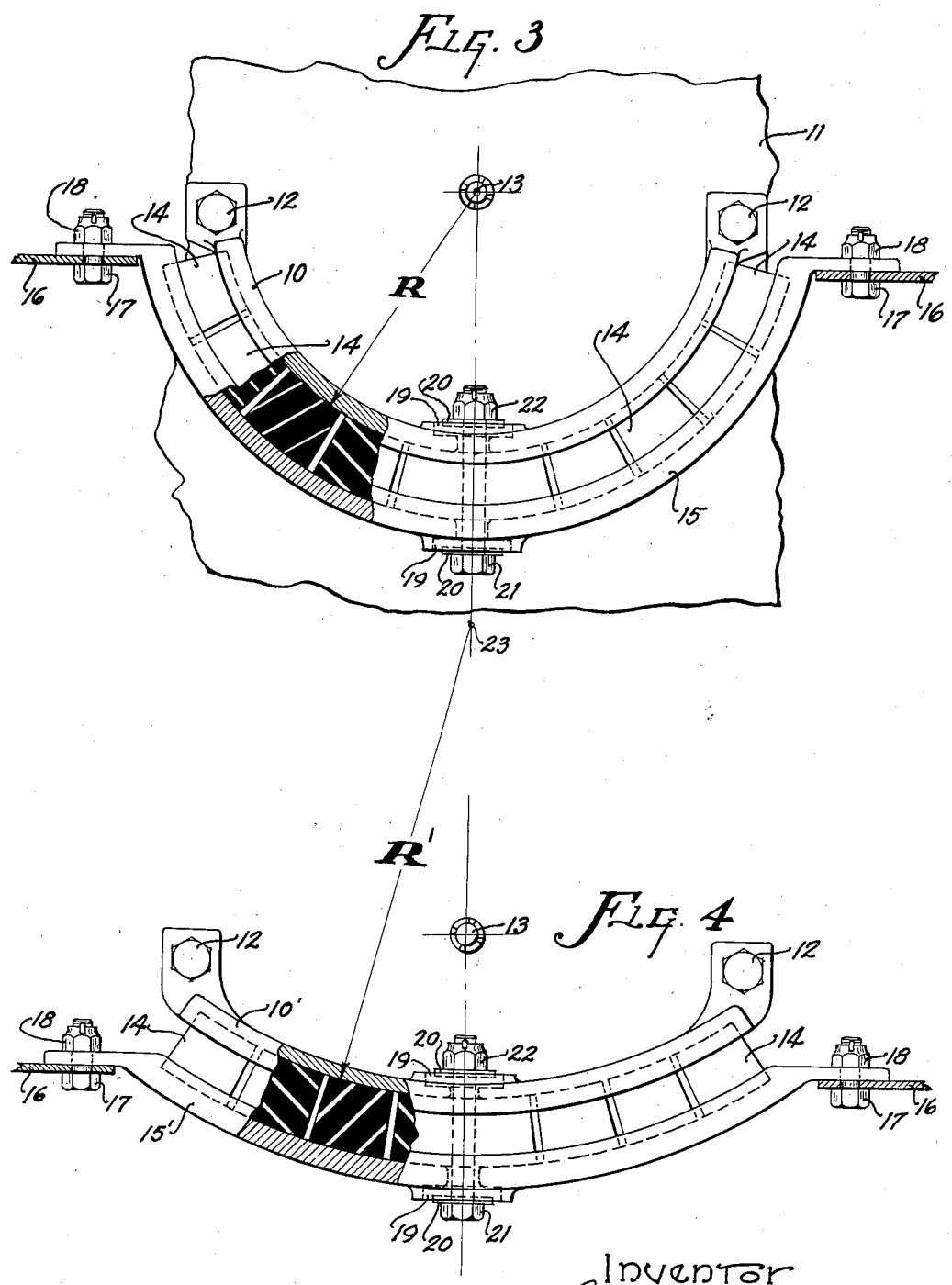

Patented Oct. 6, 1936

2,056,873

UNITED STATES PATENT OFFICE 2,056,873

ENGINE MOUNTING

Rolland S. Trott, Denver, Colo.

Application July 13, 1932, Serial No. 622,329

8 Claims. (Cl. 248—7)

My invention relates to engine mountings and more especially to engine mountings through which the forces incident to the operation of the engine will be substantially prevented from passing to the support or frame.

The object of this invention is to provide an engine mounting whereby the engine unit may be mounted by two spaced mounting means which will provide cushioned resiliently opposed substantially pivotal movement with increased resiliency of at least one of the mountings.

I accomplish this object by providing a mounting having resilient blocks spaced apart sufficiently to permit flow of rubber between the blocks.

All of this is fully described below and is illustrated is the drawings in which:—

Figure 1 is a side view of an engine unit and partial section of its front and rear mountings and a portion of the frame upon which it is mounted.

Figure 2 is a plan view of Figure 1.

Figure 3 is a fragmentary enlarged elevation and partial section looking toward the front of the engine, showing a form of front mounting, providing a low center of oscillation.

Figure 4 is an elevation and partial section through a form of front mounting similar to that shown in Figure 3 but which provides a high center of oscillation.

In Figures 1 and 2 it will be seen that the engine unit 1 is mounted on the frame 2 by the mountings 3 and 4 which are carried by the cross members 5 and 6 respectively with the torque connection 7, should one be used, engaging the frame 2 through resilient means as shown at 8. X—X indicates an axis of oscillation with a low front pivot point. Y—Y indicates an axis of oscillation with a high front pivot point. The rear mounting may be of rubber of desired construction. I will now refer to the various details of the front mounting as shown in Figures 3 and 4.

In Figure 3 the cradle 10 is attached to the engine unit 11 by the cap screws 12 or in any other proper manner, or may be made integral with any part of the front end of the engine unit. The cradle 10 in this form is made concentric on a radius R with the crankshaft 13, thereby making the crankshaft 13 the theoretical center of the oscillation or of the substantially pivotal movement provided by the front mounting. The separate rubber blocks 14 are received in one or more recesses in the lower grooved face of the cradle 10, the opposite ends of the rubber blocks being received in one or more similar recesses in the upper concentric grooved face of the pillow 15. The pillow 15 may be bolted to the cross frame member 16 by the bolts 17 and nuts 18 or may be secured thereto in any other proper manner or if desired the pillow 15 may be formed in any proper manner as an integral part of the cross member 16. The cradle 10 and the pillow 15 are resiliently held together by the rubber members 19, the washers 20, the bolt 21 and the nut 22. It will be seen that the washers 20 are centered in the recesses of the rubber members 19, which combined with the clearance provided for the bolt 21 through the pillow 15 and the cradle 10 prevents any metal to metal contact between the cradle 10 and the pillow 15, and the bolt 21 and co-acting parts.

It will be seen that the slight separation of the rubber blocks 14 provides possibility for flow of the rubber of the blocks, which in effect increases the softness and resiliency of the mounting. It will also be seen that the reception of the rubber blocks in the recesses af the cradle 10 and of the pillow 15 permits them to resiliently oppose pivotal movement of the engine unit 11 and the cradle 10 with respect to the pillow 15 about the crank shaft 13 as a theoretical center. It will also be observed that the bolt 21 and its co-acting parts, by binding the cradle 10 and the pillow 15 together will assist in the resilient resistance to the substantially pivotal movement of the engine unit 11 and the cradle 10 with respect to the pillow 15.

In the construction shown in Figure 4 the only variation from that of Figure 3 is in the fact that the rubber blocks 14 are on a radius R' from the point 23 which is spaced at some distance above the crankshaft 13 of the engine unit, thus raising the height of the theoretical center of oscillation above the crankshaft an amount depending upon the length of the radius R'. By variation of the height of the center 23 the best all-around results for any particular engine unit may be obtained. The center 23 should in any case be located laterally so that the axis of oscillation passing through the center 23 and through the pivot point of the rear mounting is in or adjacent the central plane of the engine unit as far as its weight is concerned. In most engine units the valves, manifolds and carburetor by adding weight to one side of the engine unit will cause the point 23 to be moved toward the heavy side the proper distance to obtain a balance. It will be seen that in the construction of Figure 4 another result is obtained by the elevation of the pivot point 23; that is, the flatter curve of the rubber blocks 14 permits the front mounting to provide a greater resilient resistance to the substantially pivotal movement of the cradle 10', with respect to the pillow 15'.

It will of course be seen that any of the front constructions shown in Figures 3, and 4, may by proper design and adaptation be formed for factory instead of accessory production. It will also be seen that any other proper method for attaching the cradles with their co-acting supports through rubber cushioning means to the pillow of whatever form may be provided so long as the construction limits upward rebound of the front of the engine unit while providing transverse cushioning and orbital movements and resiliently opposed substantially pivotal movements therefor.

Having now described my invention, what I claim as new and desire to protect by Letters Patent is as follows:—

1. An engine mounting comprising a supporting pillow, a cradle adapted to be connected to an engine unit, and cushion means arranged between said cradle and pillow for supporting the cradle from the pillow, said cushion means comprising a plurality of blocks of resilient material arranged aproximately in juxtaposition to each other but spaced sufficiently far apart to accommodate for the flow of the resilient material incident to the operation of the engine unit to provide increased resiliency of the cushion means of the mounting.

2. An engine mounting comprising a supporting pillow, a cradle adapted to be connected to an engine unit, and cushion means arranged between said cradle and pillow and supporting the cradle from the pillow, said cushion means comprising a plurality of rubber blocks arranged approximately in juxtaposition to each other but spaced sufficiently far apart to accommodate for the flow of rubber incident to the operation of the engine unit to provide increased resiliency of the cushion means of the mounting, said blocks being arranged in an arc the center of which is approximately centrally located above said cushion means.

3. An engine mounting comprising a supporting pillow, a cradle adapted to be connected to an engine unit having an inherent tendency of torque oscillation about a longitudinal axis during operation, and cushion means arranged between said cradle and pillow and supporting the cradle from the pillow, said cushion means comprising a plurality of rubber blocks arranged approximately in juxtaposition to each other but spaced sufficiently far apart to accommodate for the flow of rubber incident to the operation of the engine unit to provide increased resiliency of the cushion means of the mounting, said rubber blocks being arranged in an arc the center of which is approximately centrally located above said cushion means and locating the axis of oscillation approximately at the center of said arc.

4. An engine mounting comprising a supporting pillow, a cradle having means at opposite ends thereof for attachment to an engine unit, said pillow and cradle having recesses in the facing sides thereof, cushion means arranged in said recesses between said cradle and pillow and supporting the cradle from the pillow, said cushion means comprising a plurality of rubber blocks arranged approximately in juxtaposition to each other but spaced sufficiently far apart to accommodate for the flow of rubber incident to the operation of the engine unit to provide increased resiliency of the cushion means of the mounting, and a connecting member extending through said pillow and cradle for preventing separation thereof.

5. An engine mounting comprising a supporting pillow, a cradle adapted to be connected to an engine unit, and cushion means arranged between said cradle and pillow and supporting the cradle from the pillow, said cushion means comprising a plurality of rubber blocks arranged at intervals approximately throughout the length of the pillow and cradle and in juxtaposition to each other but spaced sufficiently far apart to accommodate for the flow of rubber incident to the operation of the engine unit to provide increased resiliency of the cushion means of the mounting.

6. In a motor vehicle, the combination with an internal combustion engine unit, of means mounting said engine unit in the vehicle, said mounting means comprising a supporting pillow, a cradle connected with the front portion of the engine unit, and cushion means arranged between said cradle and pillow for supporting the cradle from the pillow, said cushion means comprising a plurality of blocks of resilient material arranged adjacent to each other but spaced sufficiently far apart to accommodate for the flow of the resilient material incident to the operation of the engine unit to provide increased resiliency of the cushion means of the front mounting.

7. In a motor vehicle, the combination with an internal combustion engine unit, of means mounting said engine unit in the vehicle, said mounting means comprising a supporting pillow, a cradle connected with the front portion of the engine unit, and cushion means arranged between said cradle and pillow and supporting the cradle from the pillow, said cushion means comprising a plurality of blocks of resilient material arranged in juxtaposition to each other but spaced sufficiently far apart to accommodate for the flow of the resilient material incident to the operation of the engine unit to provide increased resiliency of the cushion means of the mounting, said blocks being arranged in an arc the center of which is located above said cushion means and below the top of the engine unit.

8. In a motor vehicle, the combination with an internal combustion engine unit, of resilient means mounting said engine unit in the vehicle for oscillatory movement about a longitudinal axis, said mounting means comprising a supporting pillow, a cradle connected with the front portion of the engine unit, and cushion means arranged between said cradle and pillow and supporting the cradle from the pillow, said cushion means comprising a plurality of blocks of resilient material arranged in juxtaposition to each other but spaced sufficiently far apart to accommodate for the flow of the resilient material incident to the operation of the engine unit to provide increased resiliency of the cushion means of the mounting, said blocks being arranged in an arc the center of which is located above said cushion means and below the top of the engine unit, said mounting means providing for oscillation about an axis extending through the center of said arc.

ROLLAND S. TROTT.